March 21, 1961
F. DALLENBACH
2,975,783
GAS TURBINE HEATER
Filed July 30, 1954
5 Sheets-Sheet 1
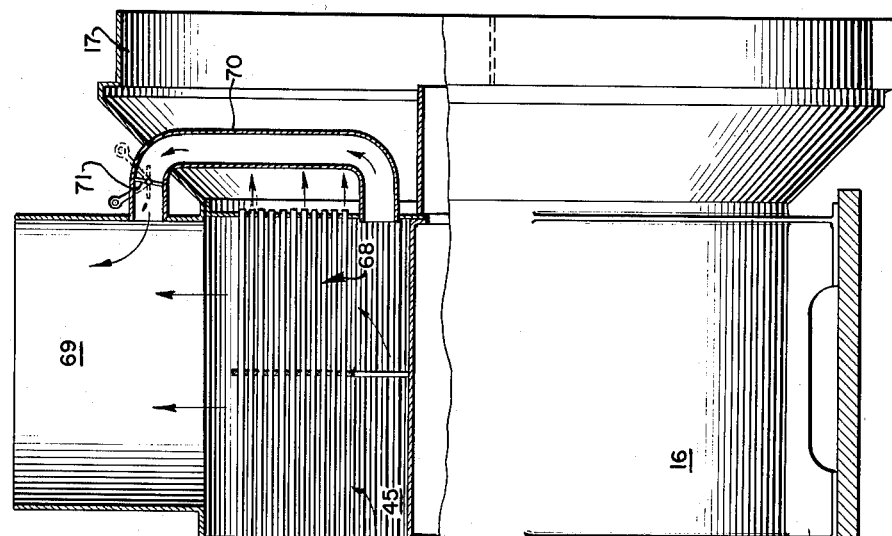
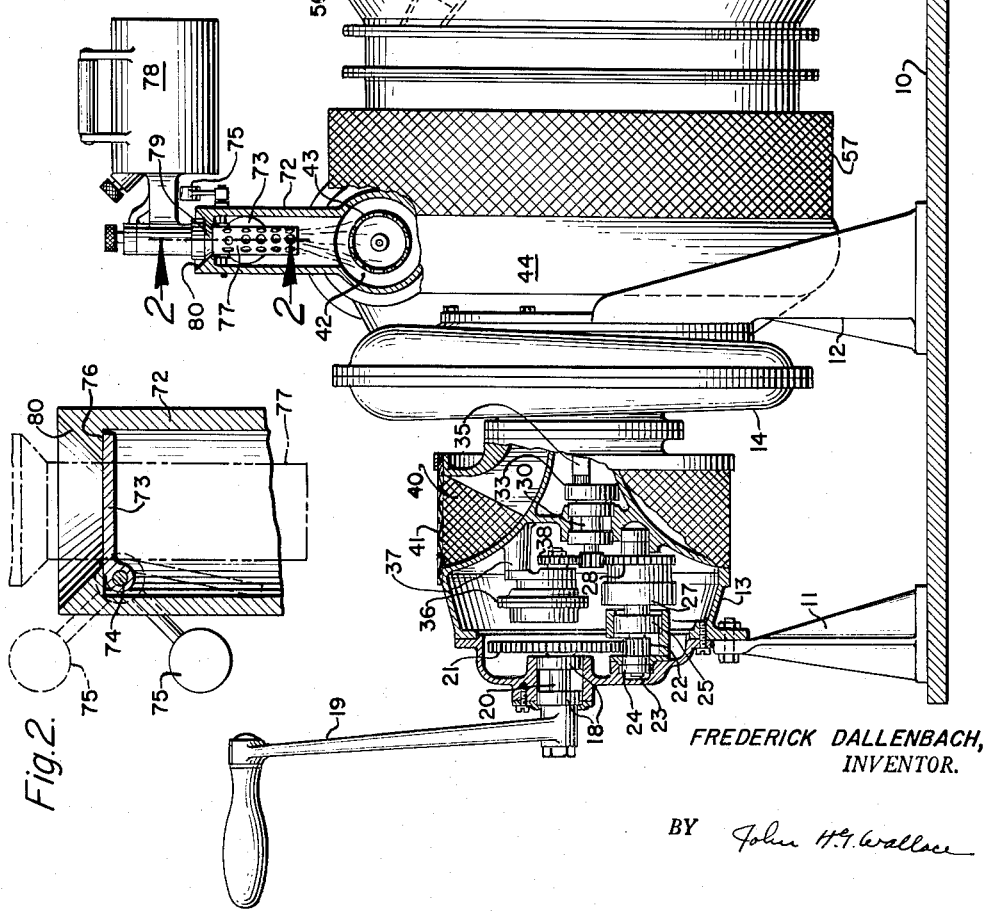
FREDERICK DALLENBACH,
INVENTOR.
BY John H. T. Wallace

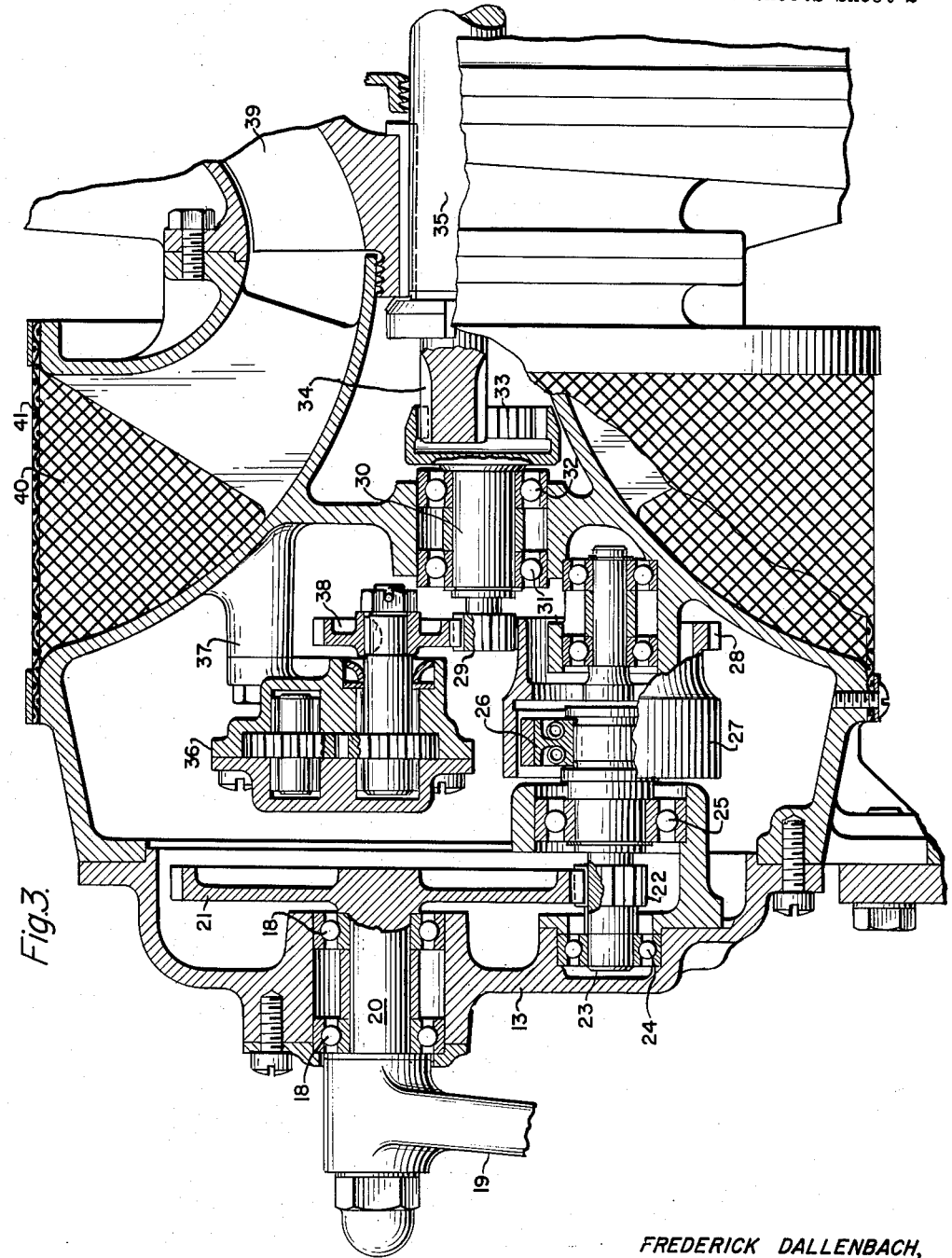

INVENTOR.
FREDERICK DALLENBACH
BY
Herschel C. Amohundro
ATTORNEY

United States Patent Office 2,975,783
Patented Mar. 21, 1961

2,975,783

GAS TURBINE HEATER

Frederick Dallenbach, Inglewood, Calif., assignor to The Garrett Corporation, Los Angeles, Calif., a corporation of California Filed July 30, 1954, Ser. No. 446,700

3 Claims. (Cl. 126—110)

The present invention relates to gas turbine heaters and more particularly to a gas turbine heater for use in supplying a large volume of fresh, heated air for various purposes when low ambient temperature conditions exist.

Prior gas turbines, which have been started by manually operated cranks, require considerable manual cranking effort to be expended before the gas turbine combustor has attained a temperature sufficiently high that combustion will be self-sustaining. Such machines employ a spark plug or igniter which are themselves incapable of furnishing sufficient energy to heat the gas turbine combustion chamber. As a consequence the operator who manually cranks such a machine to start it, exerts himself for a considerable length of time during which combustion, initiated by the igniter, heats the combustion chamber to a temperature at which it will support sufficient combustion to maintain unassisted operation of the gas turbine.

According to the present invention, a gas turbine heater provides a very efficient and compact heating system for use during low ambient temperature conditions. The present gas turbine heater employs concurrently operated manual cranking mechanism and a combination combustor heating and igniting torch which provides for easy and rapid starting thereof, even under extremely low temperature conditions. It will be understood that the overall mass of the mechanism of a gas turbine, when subjected to very low temperatures, may absorb considerable thermal energy before the temperature of and within the combustion chamber is high enough to support sufficient combustion for self-sustaining operation of the turbine. Use of the heating torch in the combustion chamber renders it capable of supporting combustion with a minimum of air flow therethrough and within a relatively short period of time whereby the manual cranking effort, necessary to start the present gas turbine heater, is maintained at a minimum. This mode of operation is very important, since it alleviates excessive manual exertion which may be physically dangerous to the operator during low temperature conditions. Separate fuel supply means are provided for the torch and for the gas turbine combustor in order to insure positive operation of the torch during combustor and turbine starting operations.

The turbine assembly of the gas turbine heater employs a pair of contra-rotating turbines, one of which drives a compressor to furnish combustion air, while the other turbine drives a fan to deliver fresh air to be heated by heat exchange with the turbine exhaust gases. Since the fan turbine operates at a lower speed than the compressor turbine and since the compressor turbine is downstream from the fan turbine, a high efficiency is obtained in the compressor turbine. This high turbine efficiency is due to the lower relative velocity of the gas entering and leaving the compressor turbine, which operates at a higher rotational speed than the fan turbine. Lower relative gas velocities across the compressor turbine result in relatively small whirl velocities of the gas leaving the discharge thereof, thus greater efficiency is obtained in the compressor turbine. A high overall efficiency is obtained because no mechanical power other than that required to operate the compressor fan and fuel pump is diverted from the production of heat produced by the gas turbine heater. Such minimum mechanical power consumption renders the gas turbine heater very efficient from the thermal standpoint, whereby it may be compact, light, and economical to operate in proportion to its heat output capacity.

An object of the present invention is to provide a gas turbine heater which may be used on the ground for the purpose of heating aircraft, dwellings and other facilities and material in a region where low ambient temperatures exist.

Another object of the invention is to provide a gas turbine heater of high heat output which is very compact in proportion to its delivery of heat.

Another object of the invention is to provide a gas turbine heater having a novel mechanical and thermal arrangement wherein kinetic energy is utilized for driving the gas turbine compressor and a fan for circulating fresh air to be heated.

A further object of the invention is to provide a gas turbine heater having novel manual cranking means in combination with a combustor heating torch whereby manual starting of the heater may be very easily accomplished.

A still further object of the invention is to provide novel means for a removable arrangement of a combustor heating torch relative to the combustor of a gas turbine.

Another important object of the invention is to provide concentric fresh air and motive gas ducts wherein an annular partition between the gas and air ducts is partially provided by a turbine wheel ring which separates turbine blades disposed in the fresh air duct and in the hot gas duct and wherein a labyrinth seal pressurized by air from the compressor of the gas turbine heater prevents combustion gases from passing from the hot gas duct into the fresh air duct.

These and other important objects will be apparent from the following specification and claims and the appended drawings, in which:

Fig. 1 is a side elevational view of a gas turbine heater according to the present invention showing portions thereof broken away and in section;

Fig. 2 is an enlarged, fragmentary sectional view taken along the line 2—2 of Fig. 1;

Fig. 3 is an enlarged, fragmentary side elevational view of one end of the gas turbine heater according to the present invention showing portions broken away and in section and illustrating in detail the reduction gear train and fuel pump together with the manual cranking means employed in starting the gas turbine heater;

Figure 4:
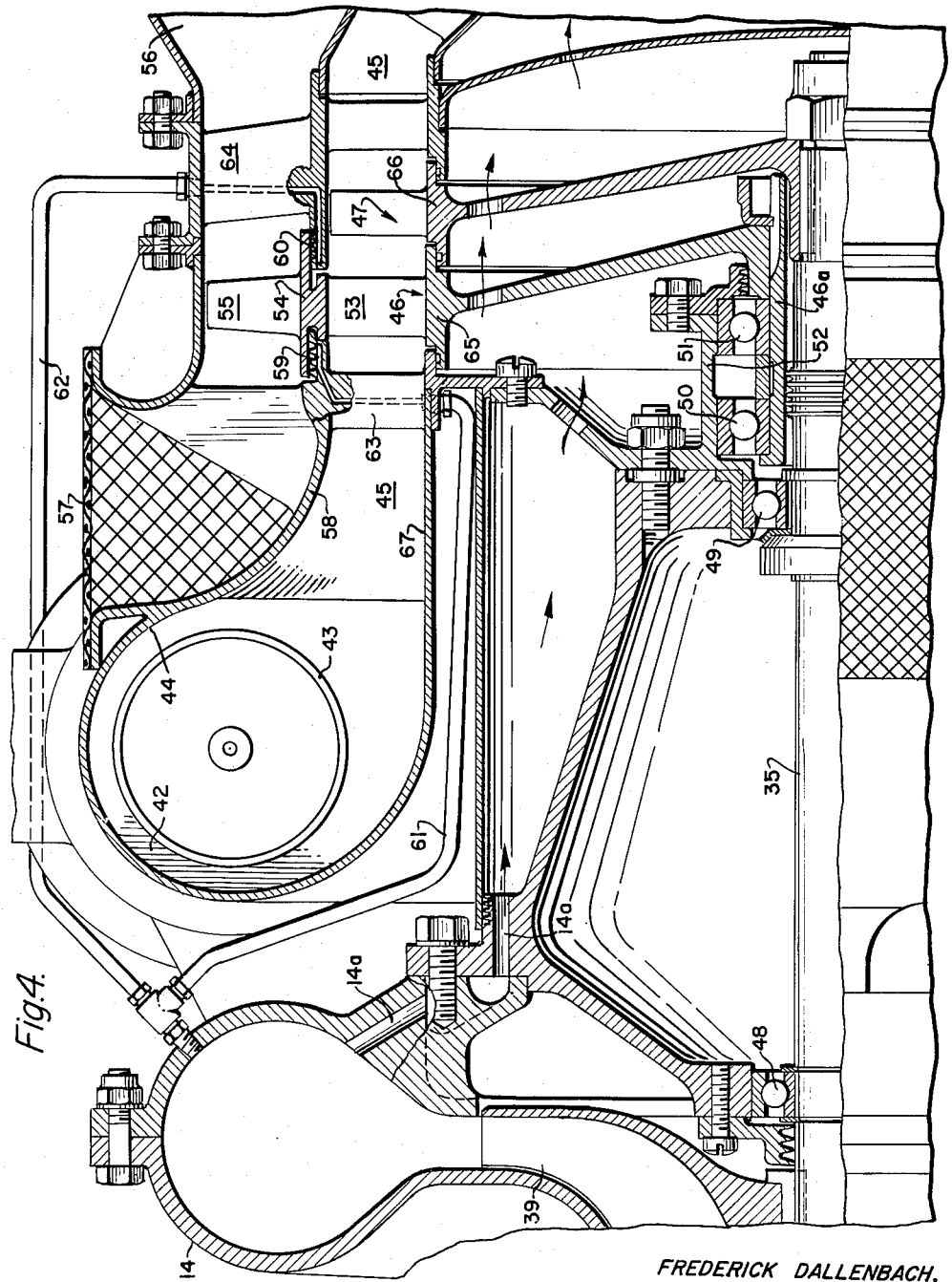
Fig. 4 is an enlarged, fragmentary side elevational view of the heater according to the present invention showing portions broken away and in section to disclose the compressor and the turbine mechanism of the gas turbine heater.

The gas turbine heater according to the present invention as shown in Fig. 1 of the drawings is provided with a base 10 having brackets 11 and 12 which support a gear case 13 and compressor scroll 14 respectively. Another bracket 15 supports a heat exchanger housing 16 and a hot air outlet duct 17. Rotatably mounted in the gear case 13 by means of bearings 18 is a manual crank 19. Fixed on a shaft 20 of the manual crank 19 is a spur gear 21 which meshes with a spur gear 22 on a shaft 23 carried by bearings 24 and 25. An overrunning clutch 26 on the shaft 25 is engageable with a clutch housing 27 having external gear teeth 28 which mesh with a spur gear 29 on a shaft 30 mounted in bearings 31 and 32. The opposite end of the shaft 30 is provided with an internal gear 33 which meshes with a gear toothed portion 34 on a compressor and turbine shaft 35. A gear pump 36 adapted to force liquid fuel to the combustor of the gas turbine heater is mounted on a bracket 37 in the gear housing 13 as shown best in Fig. 3. The fuel pump 36 is provided with a driving gear 38 which meshes with the gear 29.

Fixed on the shaft 35 is a centrifugal compressor 39 which is provided with an annular inlet 40 having a peripheral screen 41. Surrounding the centrifugal compressor 39 is the compressor scroll 14. The compressor scroll 14 communicates with a combustion chamber 42 (Fig. 1) in which a combustor 43 is positioned. The combustor 43 is adapted to burn fuel and supply hot gas to a combustion scroll 44 (see particularly Fig. 4) which communicates with a duct having an annular hot gas passage 45. The hot gas passage 45 communicates with a fan turbine 46 and a compressor turbine 47. The compressor turbine 47 is mounted on the shaft 35 which is supported by bearings 48 and 49. The fan turbine 46 is mounted on a hollow shaft 46a coaxial with and rotatable with respect to the shaft 35 by means of bearings 50 and 51 which are externally supported by a casing element 52. The fan turbine 46 is provided with blades 53 which are positioned in communication with the hot gas passage 45. Fixed to the blades 53 at the outer extremities thereof is an annular band 54 on which externally projecting fan blades 55 are carried. The fan blades 55 are arranged to force fresh air through a fresh air duct having a passage 56 which is provided with a peripheral inlet screen 57.

The hot gas passage 45 is provided with a duct wall 58 and the band 54 of the fan turbine 46 serves as a continuation of the duct wall 58 in order to separate hot gas in the passage 45 from fresh cold air in the passage 56. The duct wall 58 is provided with labyrinth seals 59 and 60 which are pressurized by compressed air from the compressor scroll 14 to prevent leakage of combustion gas into the air passage 56. It will be noted that the output air of the compressor 39 in the scroll 14 is at a higher pressure than that of the combustion gases in the hot gas passage 45. Tubes 61 and 62 communicating with the interior of the compressor scroll 14 are arranged to conduct compressor output air into the labyrinth seals 59 and 60 respectively. The higher pressure of the compressor output air thus forces the air to travel from the labyrinth seals into the passage 45 and thereby efficiently prevents leakage of combustion gases from the hot gas passage 45 into the air passage 56. The air conducted by tubes 61 and 62 passes through internal duct struts 63 and 64 respectively which are positioned to support the passages 45 and 56. Communicating with the compressor scroll 14 is a passage 14a which delivers cooling air to the fan turbine and compressor turbine wheels. The fan turbine 46 and compressor turbine 47 are provided with band portions 65 and 66 respectively which are located at the inner ends of the respective turbine blades and form a continuation of the duct wall 67 of the hot gas passage 45.

The outlet of the passage 45 as shown in Fig. 1 passes into the annular heat exchanger 68 which is provided with a surrounding casing 16. Connected with the casing is an exhaust pipe 69 adapted to conduct the combustion gases away from the gas turbine heater. A bypass conduit 70 communicates with the hot gas passage 45 and the exhaust pipe 69 in order to provide a bypass for the heat exchanger 68 to limit heating of air thereby as desired.

A butterfly valve 71 is located in the conduit 70 and may be actuated by any suitable means for the purpose of controlling the amount of hot combustion gas passing through the heat exchanger 68 in heat exchange relationship with cold air entering the same through the passage 56. Air forced through the passage 56 by the fan blades 55 passes through the tubes of the heat exchanger 68 to be heated thereby and into the outlet duct 17 to a use location.

Communicating with the combustion chamber 42, as shown in Fig. 1, is a torch supporting tube or branch passage means 72 (see also Fig. 2) having a gravity biased valve 73 therein. This tube 72 may also be termed an auxiliary burner receiving structure. The valve 73 is pivotally mounted on a pin 74 and is provided with a counterweight 75 which is adapted to close the valve 73 against a seat 76 in the upper end of the tube 72 when the nozzle structure 77 of a blow torch or auxiliary burner 78 is removed from the tube 72. The torch or auxiliary burner 78 is provided adjacent the nozzle 77 with an enlarged portion 79 adapted to intimately engage a converging seat 80 in the upper end of the tube 72 above the valve 73 to prevent leakage of combustion gas out of the tube 72 during starting operations of the gas turbine heater. The torch 78 is a manually operated torch provided with conventional means for storing fuel and for compressing air into the fuel tank to provide a fuel and oxygen mixture which may issue from the nozzle 77 of the torch and onto the combustor 43 in the combustion chamber 42 during starting operation of the gas turbine heater.

Figure 5:
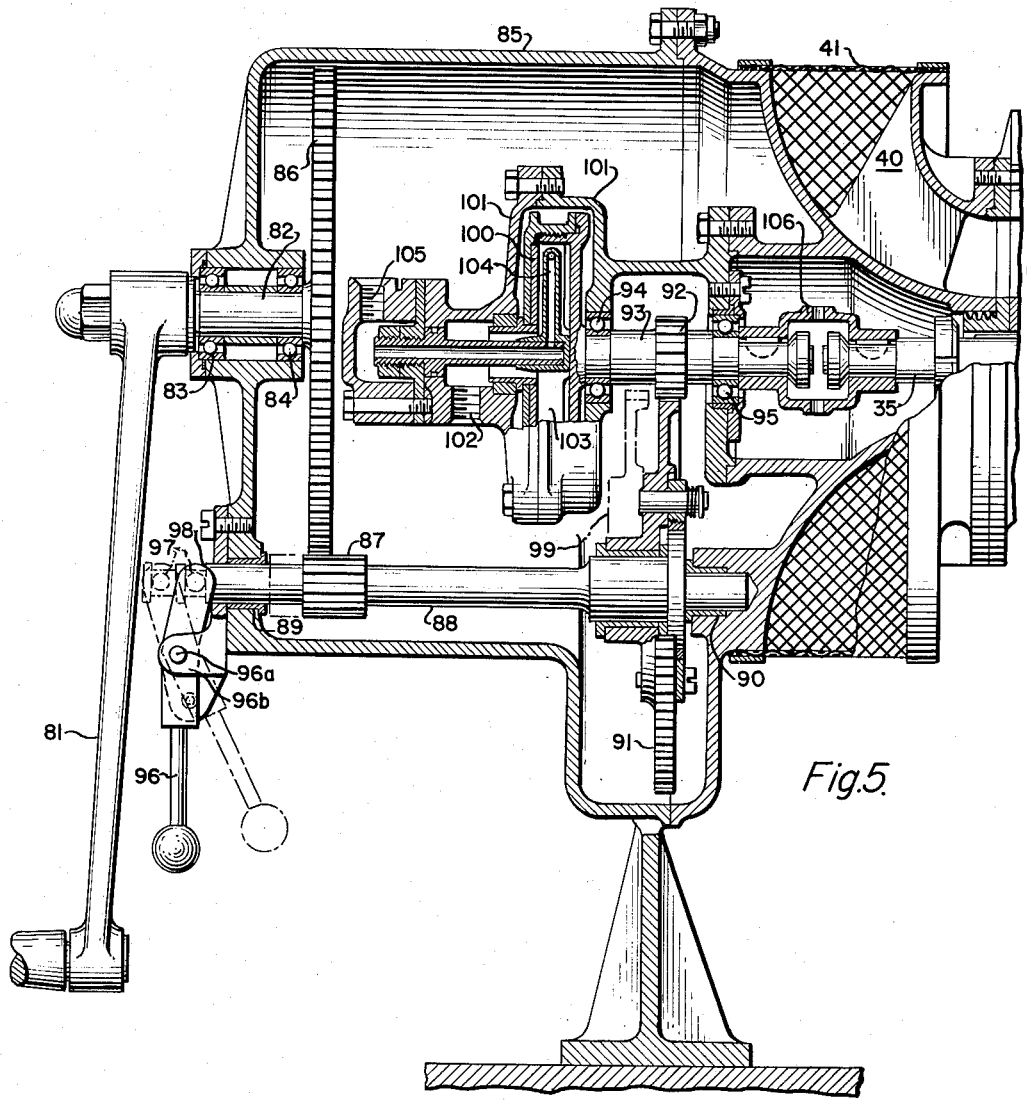
Fig. 5 is a fragmentary side elevational view of a modified form of the heater of the invention showing portions broken away and in section and disclosing an alternative manual cranking mechanism and fuel pump arrangement.
Figure 6:
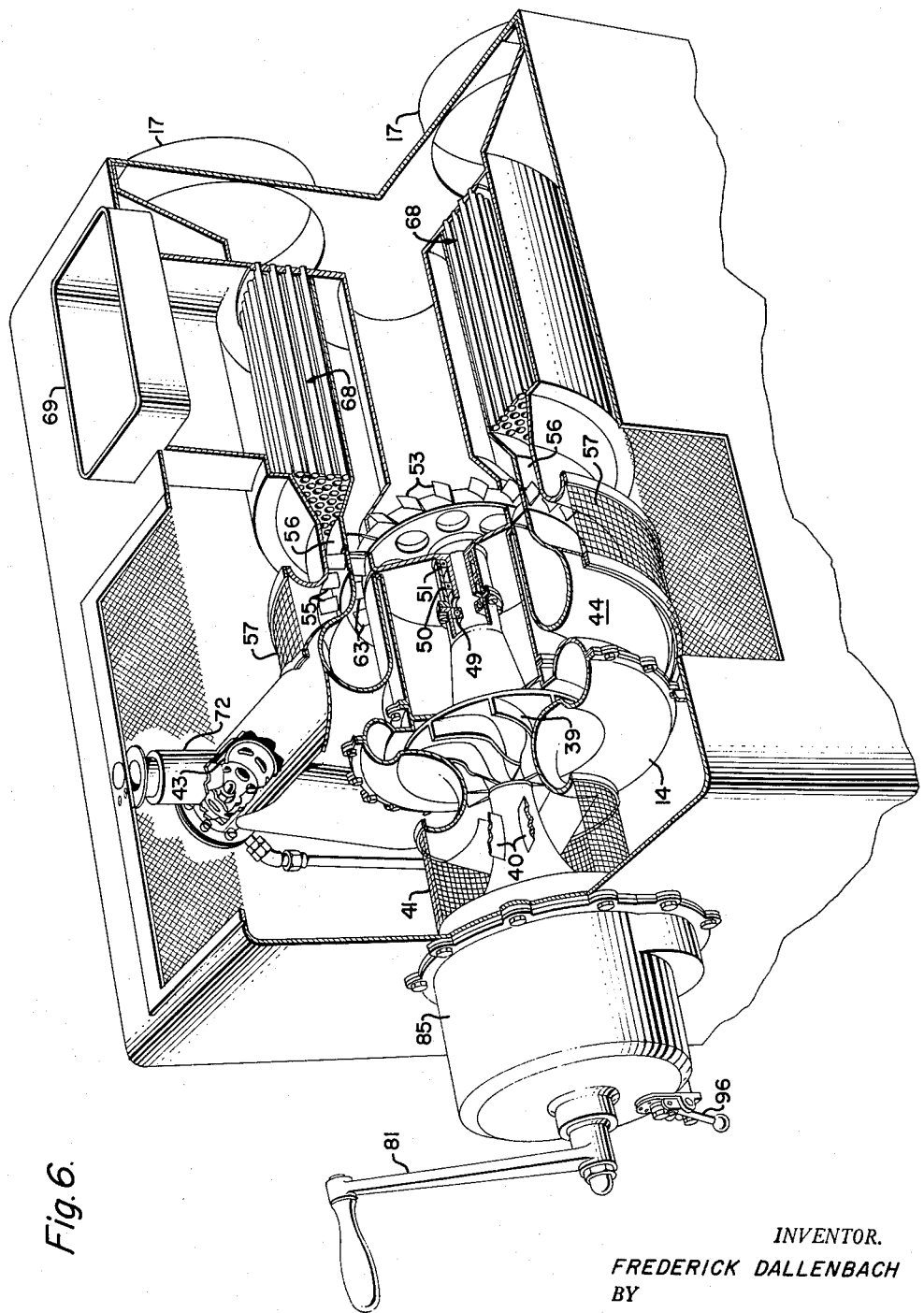
Fig. 6 is a perspective view of a gas turbine heater formed in accordance with the present invention, parts of the heater being cut away to show internal structure.

Fig. 5 illustrates a modified manual cranking and fuel pump structure as an alternative arrangement for the gas turbine heater according to the present invention. A manual crank 81 is fixed to a shaft 82 supported by bearings 83 and 84 in a housing 85. Fixed to the shaft 82 is a gear 86 which meshes with a spur gear 87 on a shaft 88 supported in bearings 89 and 90. Fixed to the shaft 88 is a spur gear 91 meshing with a gear 92 on a shaft 93 mounted in bearings 94 and 95. The shaft 88 is slidably mounted in the bearings 89 and 90 and may be axially reciprocated by means of a lever 96 pivotally mounted on a fulcrum pin 96a supported in a stationary bracket 96b on the casing 85. The lever 96 is provided with clutch pins 97 engaging an annular groove 98 in the shaft 88. Reciprocal movement of the shaft 88 in the bearings 89 and 90 provides for movement of the gear 91 to the broken line position 99 wherein it is disengaged from the spur gear 92. The broken line position 99 is the disengaged position of the gear 91 which the gear may assume after the gas turbine heater is started and the shaft 93 is rotating under power of the gas turbine.

Connected to the shaft 93 is a rotor 100 which is positioned within a casing 101 of the fuel pump employed to force combustible fuel to the combustor of the gas turbine heater. The casing 101 is provided with a fuel inlet port 102 which may communicate with suitable plumbing. The port 102 is arranged to deliver fuel to the interior 103 of the rotor 100 which, when rotating at high speed, forces the fuel outwardly by centrifugal force into the tangentially facing open end of a stationary tube 104. The tube 104 communicates with a fuel pump outlet port 105 which may be provided with suitable plumbing to conduct fuel to the combustor of the gas turbine heater. The shaft 93 is connected to the compressor and turbine shaft 35 by means of a coupling 106.

The operation of the gas turbine heater in accordance with the present invention is substantially as follows. The torch or auxiliary burner 78 is first charged with fuel and compressed air, and after it has been lit, the nozzle is inserted into the tube 72 past the valve 73 in order to direct flame onto the combustor 43 in the hot gas scroll 44. The manual crank 19 is then turned, rotating the gas turbine shaft 35. The step-up gear train 21, 22, 28, 29, 33 and 34 greatly increases the rotational speed of the shaft 35 relative to the shaft 20 so that it is possible, for example, by relatively slow speed manual operation of the crank 19 to reach a rotational speed of the shaft 35 of substantially 3000 r.p.m. Concurrent operation of the torch or auxiliary burner 78 and fuel pump 36 driven by the gear 38 in mesh with the gear 29 causes combustion to take place in the combustor 42 which results in the issuance of hot gas into the gas passage 45. Thus cooperation of the heating torch with the manual cranking arrangement alleviates exertion on the part of a person starting the gas turbine heater. The expansion of the hot gases causes rotation of the fan turbine 46 and of the compressor turbine 47 which in turn causes rotation of the shaft 35 and the compressor 39 connected therewith. As soon as the gas turbine is operating under its own power, its speed increases, and the overrunning clutch 26 disconnects the manual crank 19 from the rotating mechanism of the gas turbine. If the modified starting mechanism shown in Fig. 5 is employed, the lever 96 is moved to the broken line position to disengage the gear 91 from the gear 92 for disconnecting the crank from the rotating mechanism of the gear turbine as hereinbefore described.

After the gas turbine has accelerated to a steady running condition, the torch nozzle 77 may be removed from the tube 72. As the nozzle 77 is withdrawn from the tube 72 the valve 73 is automatically closed against the seat 76 in the tube 72 by the action of gravity causing pivoting of the weight 75 about the axis of the pin 71.

During operation of the gas turbine heater the fan turbine 46 rotates at a lower speed than the compressor turbine 47 and in an opposite direction relative thereto. For example, the fan turbine 46 may rotate at 5300 r.p.m. while the compressor turbine 47 may rotate at 12,000 r.p.m. By reason of the fact that the fan turbine 46 rotates at a lower speed than the compressor turbine 47 it reduces the relative velocities of the gas across the blades of the compressor turbine 47 and thereby provides a very efficient co-operative relationship of the turbines 46 and 47. With reference to Fig. 4 it will be seen that the shaft 35 and the fan turbine 46 are mounted on separate bearings and that with this arrangement contrarotation of the turbines 46 and 47 does not create bearing speeds larger than those at which the respective turbines rotate.

The fan blades 55 of the fan turbine 46 force air through the air passage 56 and through the heat exchanger 68 which is heated by the hot gas flowing from the gas passage 45 into the heat exchanger casing 16. In order to prevent leakage of hot gas from the passage 45 into the passage 56 labyrinth seals 59 and 60 are supplied with compressed air from the compressor scroll 14 which actually forces a small leakage of clean air from the labyrinth seals 59 and 60 into the gas passage 45, and thus contamination of the fresh air in the air passage 56 is prevented. Cooling of the fan turbine and compressor turbine wheels is provided by air passing from the compressor scroll 14 through the passage 14a and around the wheel structures inwardly of the bands 65 and 66 as shown in Fig. 4. As fresh air is drawn through the air passage 56 by the fan blades 55 of the fan turbine 46 it is forced through the heat exchanger 68 and issues from the duct 17 of the gas turbine heater to be ducted to a use location. The hot gas passing through the heat exchanger 68 from the passage 45 is exhausted from the gas turbine heater by means of the exhaust pipe 69. The by-pass conduit 70 is arranged to conduct a portion of the hot gas from the passage 45 to the exhaust pipe 69 thereby to divert some of the hot gas around the heat exchanger 68 in order to lower the temperature of the fresh air passing from the passage 56 to the outlet duct 17.

The maximum output temperature of the combustor 43 and the maximum rotation speed of the turbines 46, 47 and of the compressor 39, are controlled by the maximum capacity of the fuel pumps 36 or 100. The following operating conditions are representative of a gas turbine heater according to the present invention:

| | |
|---|---|
| Ambient air temperature | −65° F. |
| Compressor inlet temperature | −65° F. |
| Fan inlet temperature | −65° F. |
| Compressor discharge pressure | 47″ $H_2O$ ga. |
| Combustor hot gas discharge pressure | 42″ $H_2O$ ga. |
| Turbine inlet temperature | 1240° F. |
| Turbine discharge pressure | 10.3″ $H_2O$ ga. |
| Turbine discharge temperature | 1211° F. |
| Fan discharge pressure | 9.5″ $H_2O$ ga. |
| Hot air pressure in duct 17 | 6.0″ $H_2O$ ga. |
| Hot air temperature in duct 17 | 280° F. |
| Pressure in exhaust pipe 69 | Atmospheric. |
| Temperature in the exhaust pipe 69 | 280° F. |

When it is desired to reduce the temperature of the hot air in the duct 17, the bypass valve 71 is opened, permitting a portion of the hot gases from the passage 45 to bypass the heat exchanger 16 and to be dumped directly into the exhaust pipe 69. Thus, the temperature of the air delivered by the gas turbine heater into the duct 17 may be regulated as desired without changing the fuel consumption and hence without changing the speeds of the fan and compressor.

The foregoing temperatures and pressures are merely given by way of example to illustrate the general thermal operation of the gas turbine heater according to the present invention and also to exemplify the pressure relationships throughout the heater to indicate the relatively small extraction of mechanical power in relation to the thermal operation of the heater. During operation of the gas turbine heater, the temperature and pressure drops across the turbines are low so that a relatively small portion of the fuel energy is converted to mechanical power. Accordingly, a large portion of the available heat energy, obtainable from combustion of fuel is utilized for heating the air which is forced through the heat exchanger by the fan.

I claim:

1. A gas turbine heater comprising, a compressor, shaft means connected with said compressor, turbine means connected with said shaft means for driving said compressor, a combustor intercommunicating with said compressor and with said turbine means, a heat exchanger arranged to receive hot exhaust gas from said turbine means, a fan for forcing fresh air into heat exchange relation with said hot gas in said heat exchanger, said fan being connected with and driven by said turbine means, a manual crank operatively connected with said shaft, a torch-receiving structure communicating directly with said combustor, and a torch removably positioned in said receiving structure for heating the combustor during cranking of the compressor and turbine on said shaft.

2. A gas turbine heater for use during low ambient temperature conditions comprising: a compressor, a turbine disposed in driving relationship with said compressor, a combustor intercommunicating with said compressor and said turbine, a heat exchanger having passage means arranged to receive hot gases from said combustor, said heat exchanger having a fresh air passage means in heat exchange relation with the hot gas passing through said heat exchanger from said combustor, a starter for said gas turbine heater provided with means for imparting rotary motion to said turbine and said compressor, an auxiliary burner receiving structure communicating directly with said combustor; and an auxiliary burner removably positioned in said receiving structure for heating said combustor during initial starting rotation of said turbine and said compressor whereby heat supplied by said auxiliary burner to said combustor substantially reduces the energy that said starter means must impart thereto in order to rotate said turbine and said compressor and start said heater when ambient temperatures are very low.

3. A gas turbine heater comprising: casing means forming a plurality of passages having concentric annular sections, the outer section having a fresh air inlet; means forming a scroll in coaxial relation with said annular passage sections, said scroll communicating with the inner of said sections; combustor means disposed to discharge gases of combustion into said scroll; compressor means having a rotor in coaxial relation with said annular passage sections and said scroll, said compressor means communicating with said combustor to supply air under pressure thereto; a pair of turbine wheels disposed in concentric relation with said annular passage sections, said wheels having blade portions disposed in said inner annular passage section, the gases of combustion flowing through said passage section imparting rotary movement to said turbine wheels; fan blade means disposed in the outer annular passage section and supported for rotation with one of said turbine wheels to cause fresh air to flow into said inlet and through the outer annular passage section; and an annular heat exchanger in coaxial relation with said annular passage sections, said heat exchanger having a pair of fluid passages, one communicating with the inner annular passage section and the other communicating with the outer annular passage section.

References Cited in the file of this patent

UNITED STATES PATENTS

| | | |
|---|---|---|
| 1,349,482 | Wood | Aug. 10, 1920 |
| 1,621,066 | Grunwaldt | Mar. 15, 1927 |
| 2,395,416 | McCollum | Feb. 26, 1946 |
| 2,414,828 | McCollum | Jan. 28, 1947 |
| 2,415,064 | McCollum | Jan. 28, 1947 |
| 2,430,398 | Heppner | Nov. 4, 1947 |
| 2,599,470 | Meyer | June 3, 1952 |
| 2,602,293 | Goddard | July 8, 1952 |
| 2,609,659 | Price | Sept. 9, 1952 |
| 2,614,385 | Feilden | Oct. 21, 1952 |
| 2,647,684 | Lombard | Aug. 4, 1953 |
| 2,648,193 | Redding | Aug. 11, 1953 |
| 2,663,994 | Lombard et al. | Dec. 29, 1953 |
| 2,667,742 | Kuzmitz | Feb. 2, 1954 |
| 2,689,000 | Musat et al. | Sept. 14, 1954 |
| 2,714,378 | Benedek | Aug. 2, 1955 |

OTHER REFERENCES

Power Magazine, vol. 94, Jan. 1, 1950, pp. 98–101.